(12) United States Patent
Nelson et al.

(10) Patent No.: US 8,954,449 B2
(45) Date of Patent: Feb. 10, 2015

(54) METHOD AND SYSTEM FOR DETERMINING A USER'S BRAND INFLUENCE

(75) Inventors: Marcus Nelson, El Cerrito, CA (US); Jager McConnell, San Francisco, CA (US); Ciara Peter, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 125 days.

(21) Appl. No.: 13/439,200

(22) Filed: Apr. 4, 2012

(65) Prior Publication Data
US 2013/0018893 A1    Jan. 17, 2013

Related U.S. Application Data

(60) Provisional application No. 61/507,024, filed on Jul. 12, 2011.

(51) Int. Cl.
  *G06F 17/30* (2006.01)
  *G06Q 30/02* (2012.01)
  *G06Q 50/00* (2012.01)

(52) U.S. Cl.
  CPC .............. *G06Q 30/02* (2013.01); *G06Q 50/01* (2013.01)
  USPC ........................................ 707/748

(58) Field of Classification Search
  None
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff et al. |

(Continued)

OTHER PUBLICATIONS

Saba, "Saba Announces Revolutionary Social Enterprise Platform," Press Release, Mar. 20, 2012, pp. 1-4, Redwood Shores, California.

*Primary Examiner* — Bai D. Vu
(74) *Attorney, Agent, or Firm* — Dergosits & Noah LLP; Todd A. Noah

(57) ABSTRACT

A method for identifying an influencer of a brand is disclosed. The method embodiment includes scanning social media objects published by at least one social networking entity to identify a first social media object posted by a first user and relating to a brand associated with a product, an enterprise, a service, a person, a concept, and/or a trackable object. The social media objects include messages, video and audio clips, and/or image files posted by a plurality of users. The method also includes calculating a brand influence score for the first user based on a plurality of influence factors. The brand influence score for the first user is compared to a threshold influence score, and the first user is identified as a brand influencer when the first user's brand influence score is greater than the threshold influence score.

20 Claims, 6 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,236,978 B1 | 5/2001 | Tuzhilin et al. |
| 6,266,669 B1 | 7/2001 | Brodersen et al. |
| 6,288,717 B1 | 9/2001 | Dunkle et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,269,590 B2 | 9/2007 | Hull et al. |
| 7,340,411 B2 | 3/2008 | Cook |
| 7,373,599 B2 | 5/2008 | McElfresh et al. |
| 7,401,094 B1 | 7/2008 | Kesler |
| 7,406,501 B2 | 7/2008 | Szeto et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,827,208 B2 | 11/2010 | Bosworth et al. |
| 7,945,653 B2 | 5/2011 | Zuckerberg et al. |
| 8,005,896 B2 | 8/2011 | Cheah et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,103,611 B2 | 1/2012 | Tuzhilin et al. |
| 8,150,913 B2 | 4/2012 | Cheah et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0048904 A1* | 2/2009 | Newton et al. ............... 705/10 |
| 2009/0063415 A1 | 3/2009 | Chatfield et al. |
| 2009/0171748 A1* | 7/2009 | Aven et al. .................... 705/10 |
| 2009/0276459 A1* | 11/2009 | Trout et al. ................ 707/104.1 |
| 2011/0145398 A1* | 6/2011 | Bansal et al. ................. 709/224 |
| 2011/0191417 A1* | 8/2011 | Rathod ......................... 709/204 |
| 2011/0219050 A1* | 9/2011 | Ly et al. ........................ 707/827 |
| 2011/0282860 A1* | 11/2011 | Baarman et al. ............. 707/709 |
| 2012/0047219 A1* | 2/2012 | Feng et al. ................... 709/207 |
| 2012/0059848 A1* | 3/2012 | Krishnamoorthy ........... 707/770 |
| 2012/0095976 A1* | 4/2012 | Hebenthal et al. ............ 707/706 |
| 2012/0150631 A1* | 6/2012 | Root et al. ................. 705/14.49 |

\* cited by examiner

METHOD AND SYSTEM FOR DETERMINING A USER'S BRAND INFLUENCE

CLAIM OF PRIORITY

This application claims the benefit of U.S. Provisional Patent Application 61/507,024, entitled CORPORATE SOCIAL INFLUENCE, filed Jul. 12, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to an automated process for identifying a user who has influence over a brand based on the user's social networking activity.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

According to the American Marketing Association, a "brand" is defined as a "Name, term, design, symbol, or any other feature that identifies one seller's good or service as distinct from those of other sellers." Over time, a brand has evolved to encompass identity by affecting the personality of a product, company or service, and can define a perception that customers or prospects have about the underlying product, company or service. While typically associated with a product, a business or a service, a brand can also be associated with an abstract concept, e.g., environmentalism, a commodity, e.g., "got milk?", or a person or celebrity, e.g., "Oprah!". Generally, any object can be associated with a brand, and the brand can come to represent the personality or qualities of the object.

A brand identity is the outward expression of the brand, i.e., its name, catch phrase, logo and/or visual appearance. Because the brand identity is created by the brand owner, it reflects how the owner wishes to portray the company, service or product to the public. The public's actual perception of the brand is referred to as a brand image. In some cases, the brand image can be aligned with the brand identity. For example, the brand identity "Whole Foods" is the name of a grocery store that sells mostly wholesome and unprocessed foods, and consumers regard the grocery stores as a place to purchase high quality, organic, and/or unprocessed foods. Alternatively, the brand image can become misaligned with the brand identity, and in these cases, the brand owner can take corrective action to preserve the integrity of the brand.

The brand image of a brand is traditionally determined by conducting customer surveys or polls. For example, a customer will be asked to participate in a survey after he has purchased a product or service from a company, and some of the survey questions can be directed to the customer's attitudes about the company, the product or the service. Customer surveys and polls, however, can be ineffective when the questions are poorly crafted, and they can also be expensive because they require workers to gather the information and consultants to analyze the results. Moreover, even when a survey is carefully designed, many customers choose not to participate because the survey can be tedious and time-consuming.

With the growth and popularity of social networking activity supported by social networking entities, such as Facebook® and Twitter®, users have an open forum for sharing their opinions and attitudes concerning a plethora of experiences and events. At the moment, an estimated 500 million users regularly visit and/or submit content to one or more social networking entities. For example, many users frequently post their reviews and opinions of restaurants they dine at, products they purchase and/or services they use. Many others read this information and then repost the information to others in their respective networks, reply with their comments, and/or submit their reaction in some other manner, e.g., indicating they "like" the post.

Social networking information can be extremely valuable to a brand owner because, in a sense, the users are providing customer survey information that can define the brand image of the brand. For example, the brand owner of a brand associated with an electric car can monitor consumer interest in a new design of the electric car by posting its own statement and then tracking replies and/or reactions to its post, and/or tracking posts by others relating to the brand and comments and reactions to such posts. In most cases, this information is public and can be accessed by anyone subscribing to the user submitting the posts.

Currently, social media monitoring services are available that can scan the volumes of content published by social networking entities, and can collect content relating to particular subjects. Some services can provide keyword search capabilities and can collect social media containing one or more keywords. Other services also can perform a semantic and/or a grammatical analysis of the collected content to filter out content that contains a keyword but is not related to a topic of interest. One such social media monitoring service that provides keyword search capabilities and semantic analysis is Radian6 of San Francisco, Calif. Accordingly, a brand owner can utilize a social media monitoring service, such as Radian6, to gather social media content relating to its brand from at least one social networking entity to determine customer and/or consumer sentiment regarding the brand.

While this information can be extremely useful to the brand owner and/or an entity interested in the brand, it can also be difficult to manage and interpret. As stated above, over 500 million users actively participate on at least one social networking entity, and therefore the amount of social media content relating to a brand can potentially be staggering. Determining what is meaningful and what is irrelevant can be daunting, and the cost of attempting to do so can defeat the benefits of collecting the information. Nevertheless, completely ignoring social media content and the wealth of knowledge it can provide is not an option.

BRIEF DESCRIPTION OF THE DRAWINGS

In the following drawings like reference numbers are used to refer to like elements. Although the following figures

DETAILED DESCRIPTION

General Overview

Systems and methods are provided for identifying a user who is an influencer of a brand based on the user's social networking activity. According to an embodiment, the influencer can, but need not necessarily, be associated with the brand. According to exemplary embodiments, a brand influence service is provided and configured to collect social media objects, e.g., messages, video and audio clips, and image files, posted by users of social networking entities. These objects are then scanned to identify an object posted by a first user relating to a specified brand. In an embodiment, the brand influence service can be configured to calculate a brand influence score for the first user based on several influence factors that can be indicative of how much sway the first user has with regard to how others perceive or relate to the brand. According to an embodiment, once the first user's brand influence score is calculated, the brand influence service can be configured to compare it to a threshold influence score and to identify the first user as a brand influencer when the first user's brand influence score is greater than the threshold influence score.

Figure 1:
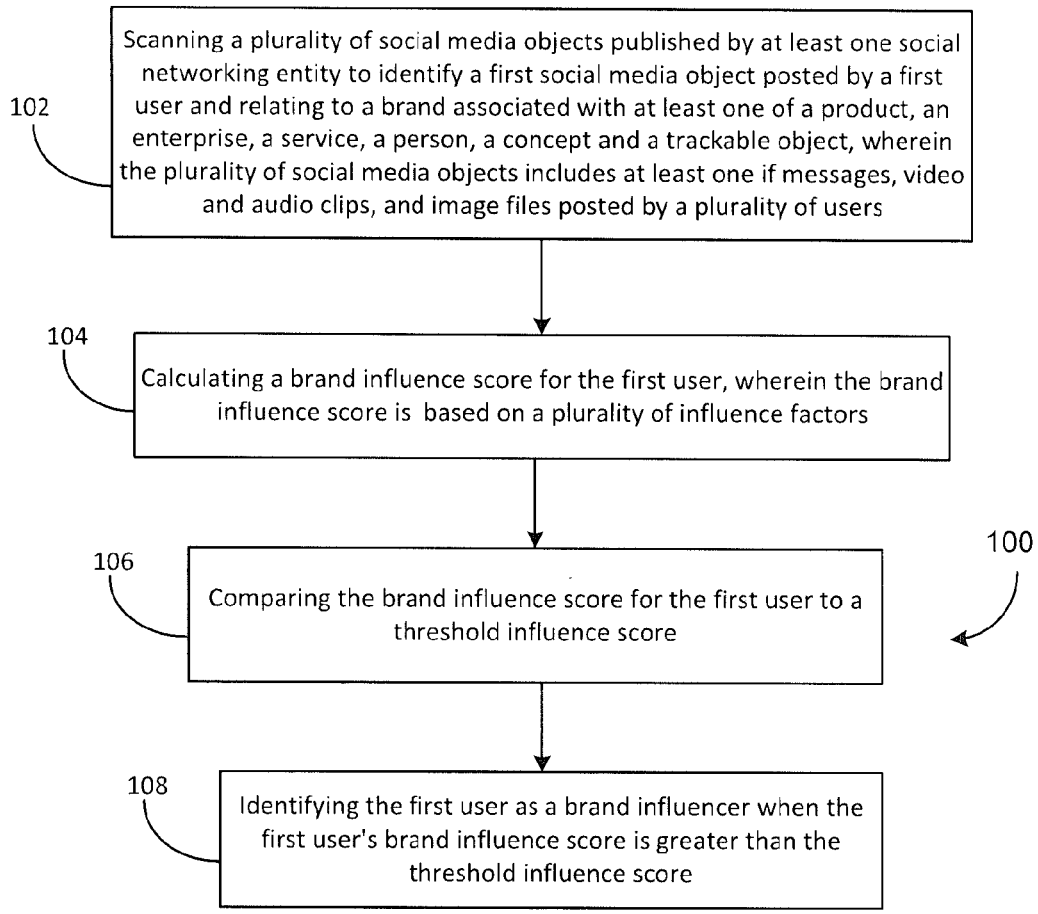
FIG. 1 is an operational flow diagram illustrating a high level overview of an exemplary method for identifying an influencer of a brand according to an embodiment.
Figure 2:
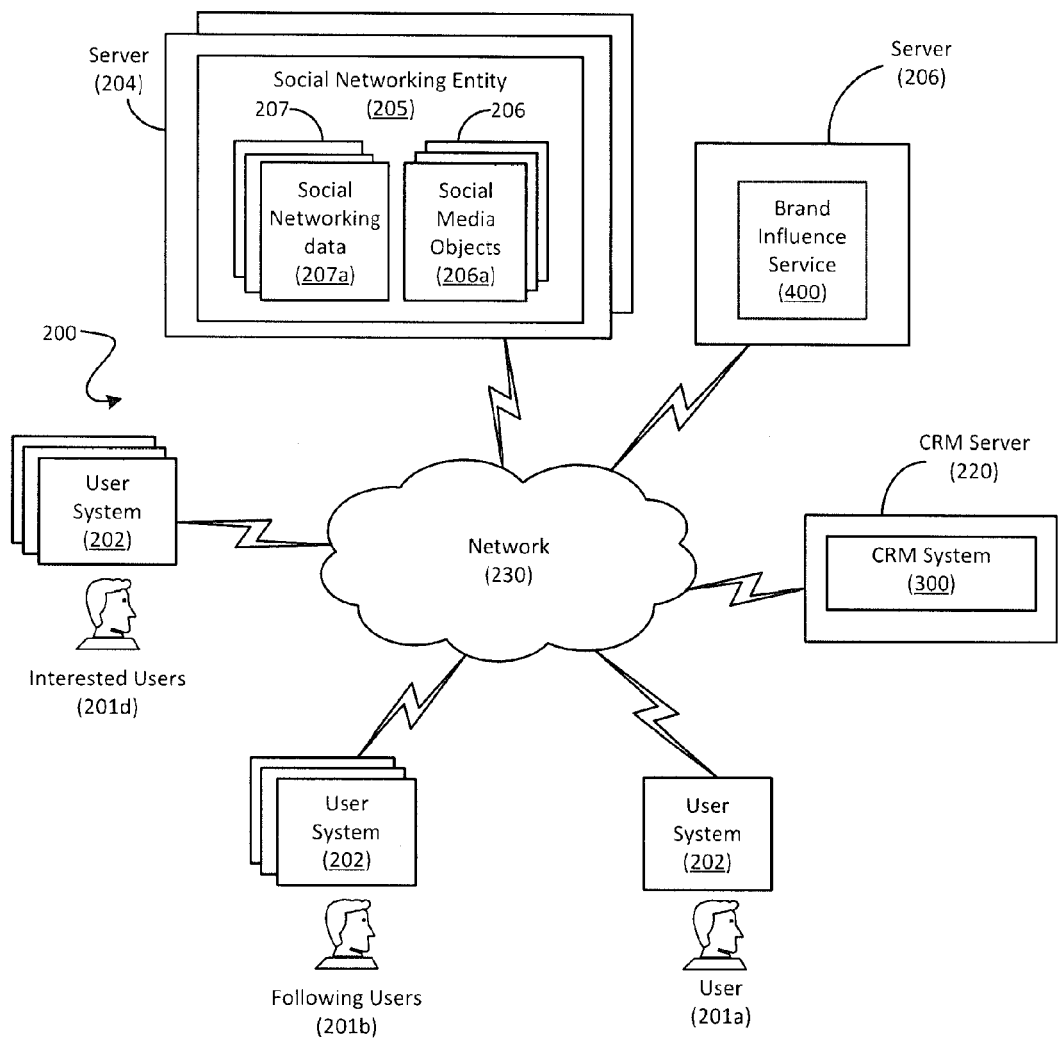
FIG. 2 illustrates a representative system for identifying an influencer of a brand according to an embodiment.
Figure 3:
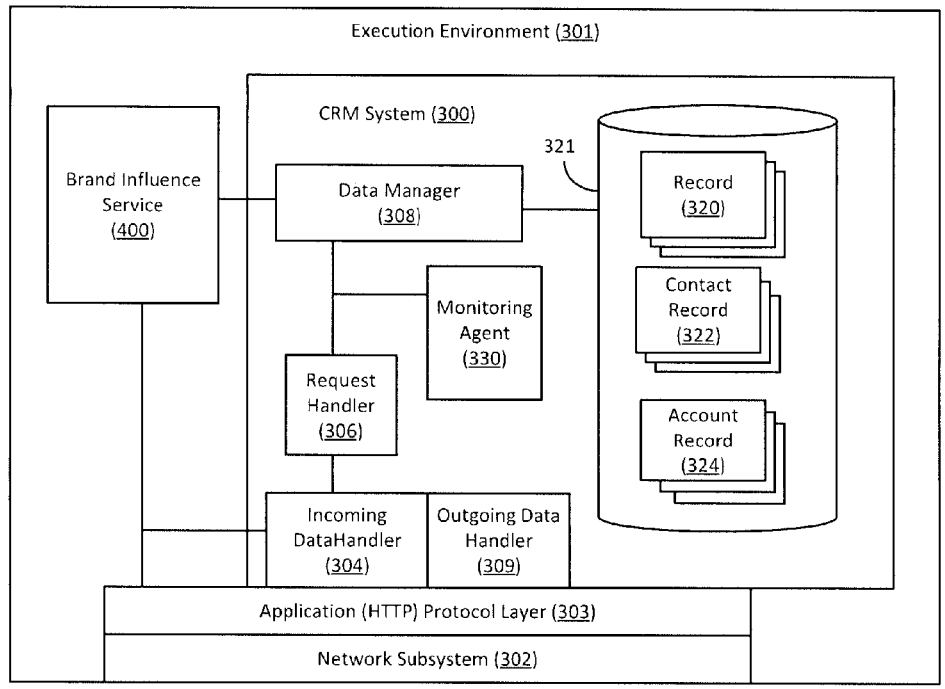
FIG. 3 is a block diagram representing an exemplary system for identifying an influencer of a brand according to an embodiment.

Referring now to FIG. 1, a flow diagram is presented illustrating a method 100 for identifying an influencer of a brand according to an embodiment. FIG. 2 and FIG. 3 illustrate representative systems 200, 300 for identifying an influencer of a brand according to an embodiment, and in particular, illustrate an arrangement of components configured to implement the method 100 of FIG. 1, which also can be carried out in environments other than that illustrated in FIG. 2 and FIG. 3.

FIG. 3 illustrates components that are configured to operate within an execution environment hosted by a physical or virtual computer node and/or multiple computer nodes, as in a distributed execution environment. Exemplary computer nodes can include physical or virtual desktop computers, servers, networking devices, notebook computers, PDAs, mobile phones, digital image capture devices, and the like. For example, FIG. 2 illustrates a plurality of user system computer nodes 202 and application server nodes 204, 206, 220 communicatively coupled to one another via a network 230, such as the Internet. In an embodiment, a CRM application server node 220 can be configured to provide an execution environment configured to support the operation of the components illustrated in FIG. 3 and/or their analogs. One example of such a CRM server 220 will be described later in greater detail during reference to later illustrated embodiments.

According to an embodiment, each user system node 202 can represent a virtual or physical computer device through which a user, e.g., user 201a, can communicate, via the network 230, with other users 201b, 201c, and with application servers, such as a social networking server 204 and the CRM server 220. In an embodiment illustrated in FIG. 3, a CRM system 300 includes components adapted for operating in an execution environment 301. The execution environment 301, or an analog, can be provided by a node such as the CRM server node 220. The CRM system 300 can include an incoming 304 and outgoing 309 data handler component for receiving and transmitting information from and to the plurality of user system nodes 202 via the network 230.

In an embodiment, the CRM system 300 includes a data store 321 for storing a plurality of data objects including a plurality of contact records 322, a plurality of account records 324, and/or other records 320 (collectively CRM records 320). As used herein, a CRM record 320 can include, but is not limited to, a tuple corresponding to a user, a file, a folder, an opportunity, an account, an event, and/or any data object. The CRM system 300 can include a data manager component 308 that can be configured to insert, delete, and/or update the records 320, 322, 324 stored in the data store 321. In addition, the CRM system 300 can include a monitoring agent 330 that is configured to monitor activities related to the CRM records 320. For example, the monitoring agent 330 can be configured to track a user's post via a public or private social networking service 205, and/or a user's email client on the user's enterprise desktop computer, and to monitor updates to the contact records 322, event records 324, and/or any other CRM record(s) 320 stored in the data store 321.

In an embodiment, the data store 321 can be a database system located in a cloud computing environment, and may be implemented as a multi-tenant database system. As used herein, the term multi-tenant database system refers to those systems in which various elements of hardware and software of the database system may be shared by one or more customers. For example, a given CRM server 220 may simultaneously process requests for a great number of customers, and a given database table may store rows for multiple customers.

Figure 4:
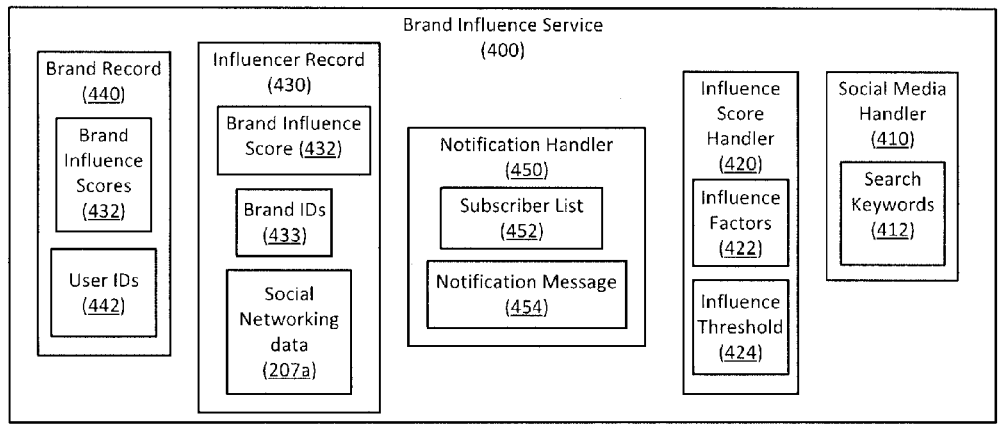
FIG. 4 is a block diagram representing an exemplary system for identifying an influencer of a brand according to an embodiment.

According to an embodiment, the execution environment 301, or an analog, provided by the CRM server node 220 can also include a brand influence service 400. Alternatively, as is shown in FIG. 2, the brand influence service 400 can be hosted by a separate server node 206 communicatively coupled to the CRM server node 220. FIG. 4 is a block diagram illustrating an exemplary brand influence service 400 according to an embodiment, which can be configured to receive information from and transmit information to the user system nodes 202, the social networking server nodes 204, and the CRM server node 220 via the network 230.

The network 230 can be a local area network (LAN) or a wide area network (WAN), such as the Internet. Each user system node 202 may include an application that allows network communication between the user system 202 and the brand influence service 400, the CRM system 300 and the social networking entities 205. Such an application can be, in an embodiment, a web portal (not shown) provided by a network browser (e.g., Chrome, Internet Explorer, Safari, etc.) or the like that is capable of sending and receiving information to and from the application servers 204, 206, 220.

FIG. 1, as stated above, illustrates a method for identifying an influencer of a brand. In this case, the method 100 can be implemented in the context of the CRM server 220 hosting the brand influence service 400 and the CRM system 300, but can also be implemented in any desired environment. For example, the method can be implemented in the context of a standalone application server 206 or in the context of the social networking server 204 hosting a social networking service 205. With reference to FIG. 1, the method 100 begins, in block 102, by scanning a plurality of social media objects published by at least one social networking entity to identify a first social media object posted by a first user and relating to a brand associated with at least one of a product, an enterprise, a service, a person, a concept, and a trackable object. In an embodiment, the scanned social media objects can include messages, video and audio clips, image files, and any other content posted by a plurality of users.

In an embodiment, the brand influence service 400 includes a social media handler component 410 configured to retrieve social media objects 206 from one or more social networking entities 205, such as Youtube, Blogger, and LinkedIn. According to an embodiment, the social media handler component 410 can be configured to receive the social media objects 206 over the network 230 via a network subsystem 302 and an application protocol layer, or other higher protocol layer, as illustrated by an exemplary HTTP protocol layer 303, among many possible standard and proprietary protocol layers. These higher protocol layers can encode, package, and/or reformat data for sending and receiving messages over a network layer, such as Internet Protocol (IP), and/or a transport layer, such as Transmission Control Protocol (TCP) and/or User Datagram Protocol (UDP).

In an embodiment, the social media handler component 410 in the brand influence service 400 can be configured to scan the retrieved social media objects 206 for specified search keywords 412 and/or content relating to a brand. For example, when the brand is directed to a particular product of a company, the social media handler component 410 can be configured to search for keywords 412 relating to the company, the industry in which the company conducts business, the product in general, and/or a model number of the product. When a first social media object 206a posted by a first user 201a contains content matching a search keyword 412, the social media handler 410 can be configured to analyze the object 206a contextually and semantically to determine whether it is, in fact, related to the brand. A social media handler 410 configured to scan and contextually analyze social media objects 206 from one or more social networking entities 205 is provided by Radian6 of San Francisco, Calif.

Referring again to FIG. 1, once the first social media object, e.g., 206a, posted by the first user 201a and relating to the brand is identified, a brand influence score is calculated for the first user 201a based on a plurality of influence factors in block 104. In an embodiment, an influence score handler component 420 in the brand influence service 400 can be configured to calculate the brand influence score for the first user 201a, wherein the brand influence score is based on a plurality of influence factors 422.

According to an embodiment, the plurality of influence factors 422 can be used to determine whether and to what extent the first user 201a is likely to be someone who shapes and/or controls how other users perceive or relate to the brand. For example, an influence factor 422 can be related to a number of following users 201b following the first user 201a via at least one social networking entity 205 because when the first user 201a is followed by, and/or friends with, tens of thousands of following users 201b who will potentially view the first user's posts, this fact can be an indication that the first user 201a is highly influential.

In an embodiment, another influence factor 422 can be related to a social and/or professional status or attribute of a following user 201b, i.e., who is following the first user 206a. For example, when a following user's professional status or attribute indicates that she is the chief executive officer (CEO) of a rival of the brand, this fact can be an indication that the first user 201a is highly influential because the rival's CEO is presumably interested in viewing the first user's posts. Another influence factor 422 can be directed to a number and/or a social and/or professional status/attribute of second degree users following the following user 201b, and whether the first social media object 206a is reposted by the following users 201b to their respective following users. For example, when a following user 201b is a film or music recording celebrity who is followed by millions of user fans, the first social media object 206a posted by the first user 201a can potentially reach the millions of user fans when the celebrity following user 201b reposts the first social media object 206a. In an embodiment, another influence factor 422 can be directed to a leading user 201c followed by the first user 201a, and/or a status/attribute of the leading user 201c.

In another embodiment, an influence factor 422 can be related to reactions and comments to the first social media object 206a. For example, the first user 201a can be considered influential with respect to the brand when the first social media object 206a posted by the first user 201a generates numerous comments from following users 201b and/or numerous users indicate that they agree with, or have an affinity toward, the first social media object 206a. In an embodiment, such a reaction can be submitted when a user "likes" the first social media object 206a and/or a comment relating to the first social media object 206a. In addition, another influence factor 422 can be directed to how many other social media objects 206 relating to the brand have been posted by the first user 201a. For example, when the first user 201a has posted hundreds of messages, images and audio/video clips relating to the brand, this fact can indicate that the first user 201a is influential with respect to the brand.

Other influence factors 422 can be defined and directed to a variety of subjects. For example, a non-exhaustive list of influence factors 422 can be directed to:

whether the first user is an employee or a consumer of the brand;

whether the first user is an existing or prospective customer of the brand;

whether the first user is an executive of an existing or prospective enterprise customer of the brand;

whether the first user is unaffiliated with the brand;

the first user's position in the industry concerning the brand;

how frequently the first user posts social media objects relating to the brand;

whether the first user posts social media objects relating to rivals of the brand; and other areas that can indicate whether and to what extent the first user is likely to be someone who shapes and/or controls how other users perceive or relate to the brand.

In an embodiment, each influence factor 422 can be weighted by a weighting factor to reflect its importance relative to the other influence factors 422. For example, when influence factors 422 are directed to attributes of the first user 201a, the influence factors can be weighted by weighting factors based on those attributes, such as an identity of the first user 201a, an occupation of the first user 201a, a company with which the first user 201a is affiliated, a title of the first user 201*a* with respect to the company, and/or whether the company is an existing or prospective customer of the brand. Accordingly, when the influence factor 422 is directed to the title of the first user 201*a*, the weighting factor for the title of "executive buyer" can be greater than the weighting factor for the title of "mailroom personnel."

In another embodiment, when influence factors 422 are directed to attributes of the following users 201*b* and/or the leading users 201*c*, the influence factors 422 can be weighted by weighting factors based on those attributes, such as an identity of a following 201*b* or leading 210*c* user, a relationship between the following 201*b* or leading 210*c* user and the first user 201*a*, an occupation of the following 201*b* or leading 210*c* user, a company with which the following 201*b* or leading 210*c* user is affiliated, a title of the following 201*b* or leading 210*c* user with respect to the company, and whether the company is one of an existing or prospective customer of the brand. Accordingly, when the influence factor 422 is directed to the relationship between the following 201*b*/leading 210*c* user and the first user 201*a*, the weighting factor for a social relationship can be greater than the weighting factor for a professional relationship.

The weighting factor of an influence factor 422 can be at least equal to one (1) and can be determined by an administrator or by default in an embodiment. Alternatively or in addition, a brand administrator (not shown) can provide the weighting factor of the influence factor 422 to reflect the brand's preferences.

In an embodiment, the influence score handler component 420 can be configured to retrieve public real-time social networking data 207*a* of the first user 201*a* from the social networking entities 205, and to analyze this data in light of at least one of the plurality of influence factors 422. In addition, the influence score handler component 420 can be configured to determine whether data relating to the first user 201*a* exists in the CRM system 300, and if it does, to include that data in the analysis. In an embodiment, the influence score handler component 420 can be configured to generate at least one search query for CRM records 320, 322, 324 relating to the first user 201*a* and to submit the search queries to the data manager component 308 in the CRM system 300, which can be configured to retrieve and return CRM records 320, 322, 324 satisfying the search queries.

For example, the influence score handler component 420 can be configured to generate a search query based on information identifying the first user 210*a*, e.g., a name, an email address, a social networking handle, etc., and to submit the query to the data manager component 308. In response, the data manager component 308 can retrieve from the data store 321 and return to the influence score handler component 420 a contact record 322 and/or other records 320, 324 satisfying the query. For instance, when the query is broad, e.g., "retrieve all records containing the first user's name," the data manager 308 can retrieve a contact record 322 corresponding to contact information of the first user 201*a*, and an account record 324 corresponding to an account with which the first user 201*a* is associated.

According to an embodiment, an influence factor 422 can be treated as a question relating to the first user 201*a*, and a raw score for the influence factor 422 can be determined based on an answer to the question. In an embodiment, the answer can be derived at least in part from the first user's real-time social networking data 207*a* and/or the data stored in the CRM system 300. For instance, an influence factor 422 that is directed to a number of following users 201*b* can be treated as the question, "How many users follow the first user 201*a* and how many friends does the first user 201*a* have?"

The influence score handler component 420 can be configured to answer this question based at least in part on the real-time social networking data 207*a* that indicates the current number of friends and followers 201*b* following the first user 201*a*.

As stated above, the raw score for the influence factor 422 can be determined based on the answer to the question. In an embodiment, the raw score for an influence factor 422 can be a value between a minimum value, e.g., zero (0), and a maximum value, e.g., ten (10). The minimum value can indicate a low level of influence and the maximum value can indicate a high level of influence of the first user 201*a* relative to the brand according to this particular influence factor 422. Accordingly, referring to the previous example, when the number of following users 201*b* following the first user 201*a* is low or lower than a minimum threshold value, the determined raw score can be the minimum value, indicating that the first user 201*a* is not influential with respect to the brand based on the number of users 201*b* following the first user's posts. Alternatively, when the number of followers 201*b* is high, e.g., above a maximum threshold value, the determined raw score can be the maximum value, indicating that the first user 201*a* is influential with respect to the brand based on this influence factor 422. In an embodiment when the influence factor 422 is weighted by a weighting factor, the determined raw score can be multiplied by the weighting factor to generate a weighted raw score for the influence factor 422.

In an embodiment, the raw or weighted raw score for an influence factor 422 can be normalized to account for an anomaly in the underlying real-time social networking data 207 and/or the underlying CRM data derived from the CRM records 320, 322, 324. For example, the weighted raw score of an influence factor 422 directed to reposts by following users 201*b* can spike when the first social media object 206*a* posted by the first user 201*a* is reposted by the CEO of a company related to the brand. Under these circumstances, the influence score handler component 420 can be configured to normalize the raw or weighted raw score for the influence factor 422 based on other considerations such as large influx of new followers, changes in behavior, frequency or sudden infrequency (e.g., a user goes on vacation).

According to an embodiment, once the raw score and/or the weighted raw score for each influence factor 422 considered is determined, and, if needed, normalized, the influence score handler 420 can be configured to determine the brand influence score 432 for the first user 201*a* by accumulating the raw and/or weighted raw scores to generate a sum of the raw and/or weighted raw scores. In an embodiment, the sum of the raw and/or weighted raw scores is the brand influence score 432 for the first user 201*a* and indicates the extent to which the first user 201*a* influences how other users think about and/or relate to the brand.

Referring again to FIG. 1, in block 106, the brand influence score 432 for the first user 201*a* is compared to a influence threshold value, and in block 108, the first user is identified as a brand influencer when the first user's brand influence value 432 is greater than the influence threshold influence score. In an embodiment, the influence score handler component 420 can be configured to compare the brand influence score 432 for the first user 201*a* to an influence threshold value 424 and to identify the first user 201*a* as a brand influencer when the first user's brand influence score 432 is greater than the influence threshold value 424. According to an embodiment, the brand influencer influences how other users relate to and/or think about the brand.

The influence threshold value 424 can be a default value set by an administrator of the brand influence service 400 and/or of the CRM system 300 in an embodiment. Alternatively or in addition, the influence threshold value 424 can be a value defined by the brand owner and/or an entity interested in the brand in another embodiment. The influence threshold value 424 can be updated by the brand owner and/or the interested entity depending on the needs of the owner or interested entity. For example, when the brand owner has launched a new product and is interested in collecting comments from a broad range of users, the influence threshold value 424 can be updated to a relatively low value to identify a larger number of major and minor brand influencers. On the other hand, when the brand owner is interested in monitoring brand sentiment over time, the brand owner may be interested in identifying only the most powerful of brand influencers, and the influence threshold value 424 can updated to a relatively high value to filter out minor brand influencers. Accordingly, the first user 201a can be identified as a brand influencer in some cases and not in other cases, depending upon the applied influence threshold value 424.

In an embodiment, when the first user 201a is identified as a brand influencer, the influence score handler 420 can be configured to create a brand influencer record 430 associated with the first user 201a and to store the first user's brand influence score 432 and an identifier identifying the brand 433 in the influencer record 430. Along with the score 432, the first user's social networking data 207a relied upon to calculate the score 432 can also be stored in the influencer record 430. In addition or alternatively, a brand record 440 associated with the brand can also be created and the first user's brand influence score 432 and an identifier identifying the first user 442 can be stored in the record 440 along with the brand influence scores 432 and identifiers 442 of other users identified as brand influencers.

According to an embodiment, the influencer 430 and/or brand 440 records can be stored and maintained in the brand influence service 400, as shown in FIG. 4. Alternatively or additionally, the influencer 430 and/or brand 440 records can be stored in the data store 321 of the CRM system 300. In this embodiment, the influencer 430 and/or brand 440 records can be maintained and managed by the data manager 308 in the CRM system 300. When the CRM system 300 includes a multi-tenant on-demand database system described above, the brand can be related to a tenant of the multi-tenant on-demand database system and therefore, the brand record 440 can be integrated with other CRM records 320, 322, 324 associated with the tenant.

According to an embodiment, the first user's brand influence score 432 can be recalculated from time to time and/or under certain circumstances to ensure that the first user 201a continues to be a brand influencer. For example, in an embodiment, the brand influence scores 432 of each brand influencer can be recalculated periodically, e.g., every ten (10) days, during a regular management routine. In another embodiment, the influence score handler component 420 can be configured to recalculate the first user's brand influence score 432 when a predetermined time period has lapsed between the posting of the first social media object 206a and another posting of another social media object relating to the brand. Alternatively or additionally, in an embodiment, a score recalculation can be triggered when an attribute of the first user 201a is updated, e.g., the first user 201a is no longer employed by the brand, and/or when an influence factor 422 is updated, e.g., a weighting factor is modified or a new influence factor 422 is defined.

In an embodiment, the brand influence service 400 can include a notification handler component 450 configured to generate an alert notification message 454 identifying the first user 201a as a brand influencer, and configured to transmit the alert notification message 454 to at least one interested user 201d. In addition to identifying the first user 201a, the alert notification message 454 can include a recommendation for the interested user 201d to follow the first user 201a. In an embodiment, an interested user 201d can be a user who is affiliated with the brand, e.g., the brand owner, or a user not affiliated with the brand but interested in monitoring social media activities relating to the brand, e.g., a market researcher or a competitor of the brand.

According to an embodiment, prior to sending the notification message 454, the notification handler component 450 can be configured to receive a subscription request from an interested user 201d requesting notifications relating to the brand. The subscription request can be received over the network 230 from a user system 202 associated with the interested user 201d via the network subsystem 302 and the application protocol layer 303. In another embodiment, the notification handler component 450 can be configured receive a command message identifying at least one interested user 201d and including a command to subscribe the identified interested user(s) 201d to notifications relating to the brand.

The subscription request and/or command message can be transmitted directly to the brand influence service 400 or can be routed to the brand influence service 400 via an incoming data handler 304 in the CRM system 300. In an embodiment, when the request/command is received, the notification handler component 450 can be configured to subscribe the interested user(s) 201d to the influencer record 430 associated with the first user 201a and/or to the brand record 440. Accordingly, when the first user 201a is identified as a brand influencer and the brand record 440 is updated to include the first user's identifier 442, the alert notification message 454 can be generated and transmitted to the interested user(s) 201d pursuant to the subscription.

According to an embodiment, the notification message 454 identifying the first user 201a as a brand influencer can be transmitted to a user system 202 associated with the interested user 201d. For example, in an embodiment, the notification handler 450 can be configured to build the notification message 454 and to provide it to the outgoing data handler component 309 in the CRM system 300. The outgoing data handler 309 can be configured to interoperate directly with the protocol layer of the network subsystem 302 or with the application protocol layer 303. The notification message 454 can be transmitted as a whole or in parts via the network subsystem 302 over the network 230 to the user system 202 associated with the interested user 201d.

Figure 5:
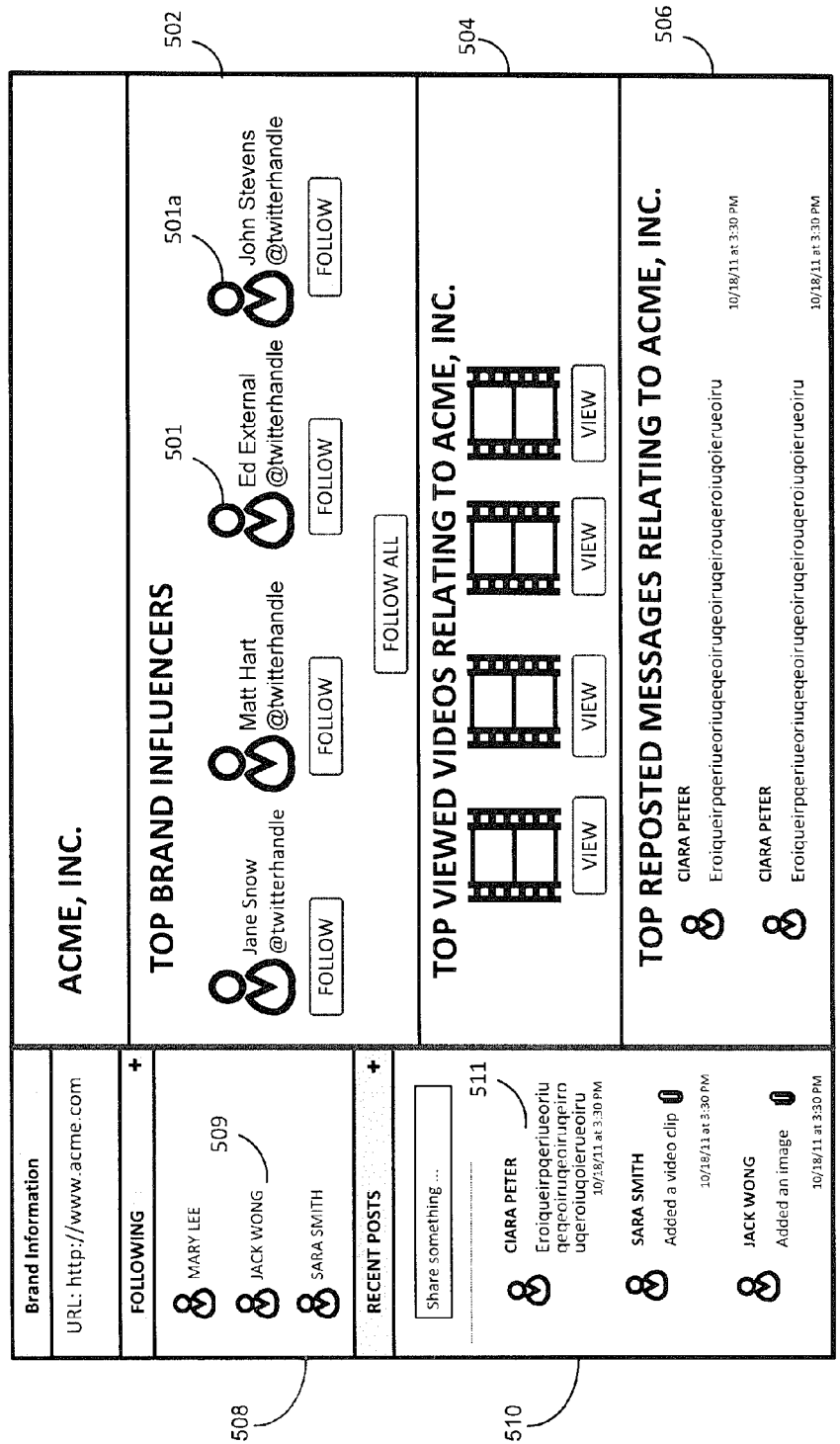
FIG. 5 illustrates an exemplary user interface displayed by a user system presenting brand information according to an embodiment.

When the notification message 454 is received, the user system 202 can be configured to parse the message 454 and to render the information identifying the first user 201d on a user interface. FIG. 5 illustrates an exemplary user interface 500 for displaying the information identifying at least one brand influencer including the first user 201a. In an embodiment, the user interface 500 can include a plurality of presentation windows for displaying information relating to the interested user 201d and to the brand. For example, the user interface 500 can include a presentation window 502 for displaying icons representing the top brand influencers 501 including an icon representing the first user 501a. Each icon 501 can identify the corresponding user by name and/or social media handle or username. In an embodiment, the interested user 201d can choose to follow any of the top brand influencers presented in the presentation window 502 by selecting a "follow" button associated with each of the icons 501. Alternatively, the interested user 201*d* can be automatically registered to follow the top brand influencers by selecting a "follow all" button.

In an embodiment, the user interface 500 can also include presentation windows for presenting popular social media objects relating to the brand. For example, a first presentation window 504 can present the top viewed videos relating to the brand, and a second presentation window 506 can present the top reposted messages relating to the brand. Moreover, in another embodiment, the user interface 500 can include a third presentation window 508 for displaying brand influencers 509 followed by the interested user 201*d*, and another presentation window 510 for social media objects 511 recently posted by the brand influencers 509 followed by the interested user 201*d*.

System Overview

Figure 6:
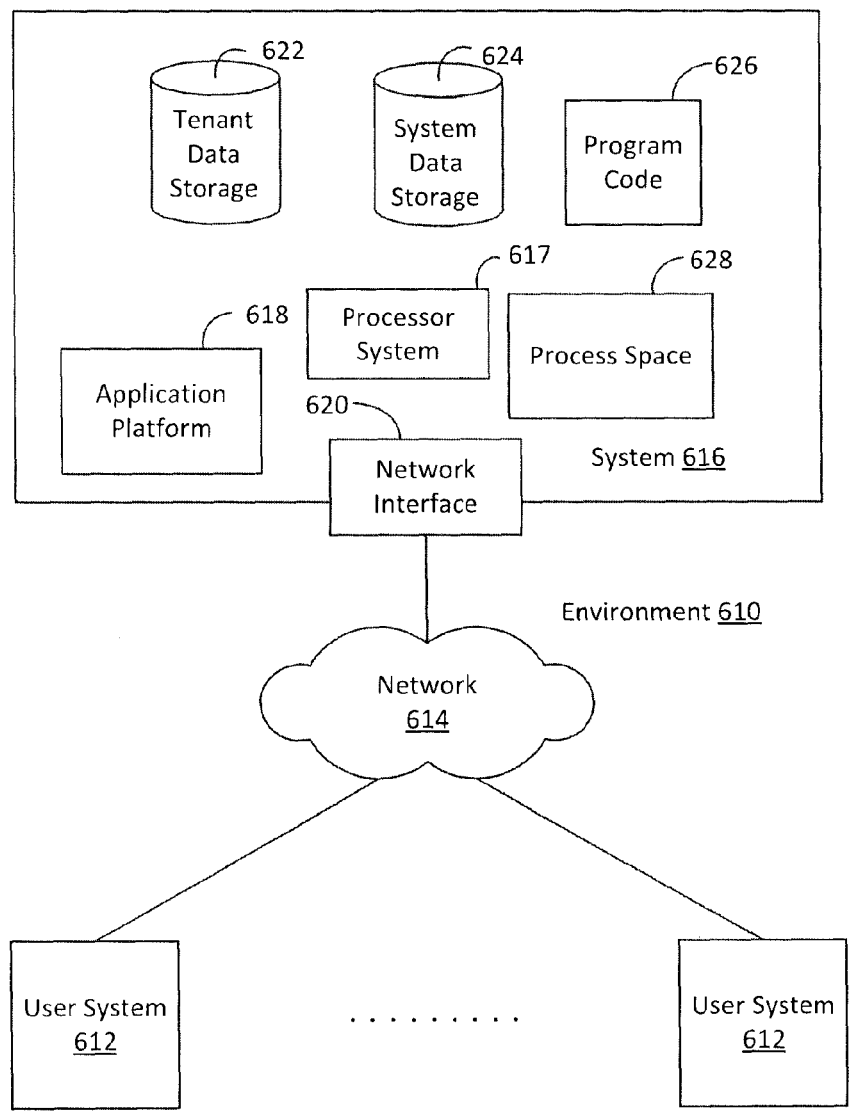
FIG. 6 illustrates a block diagram of an example of an environment where an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
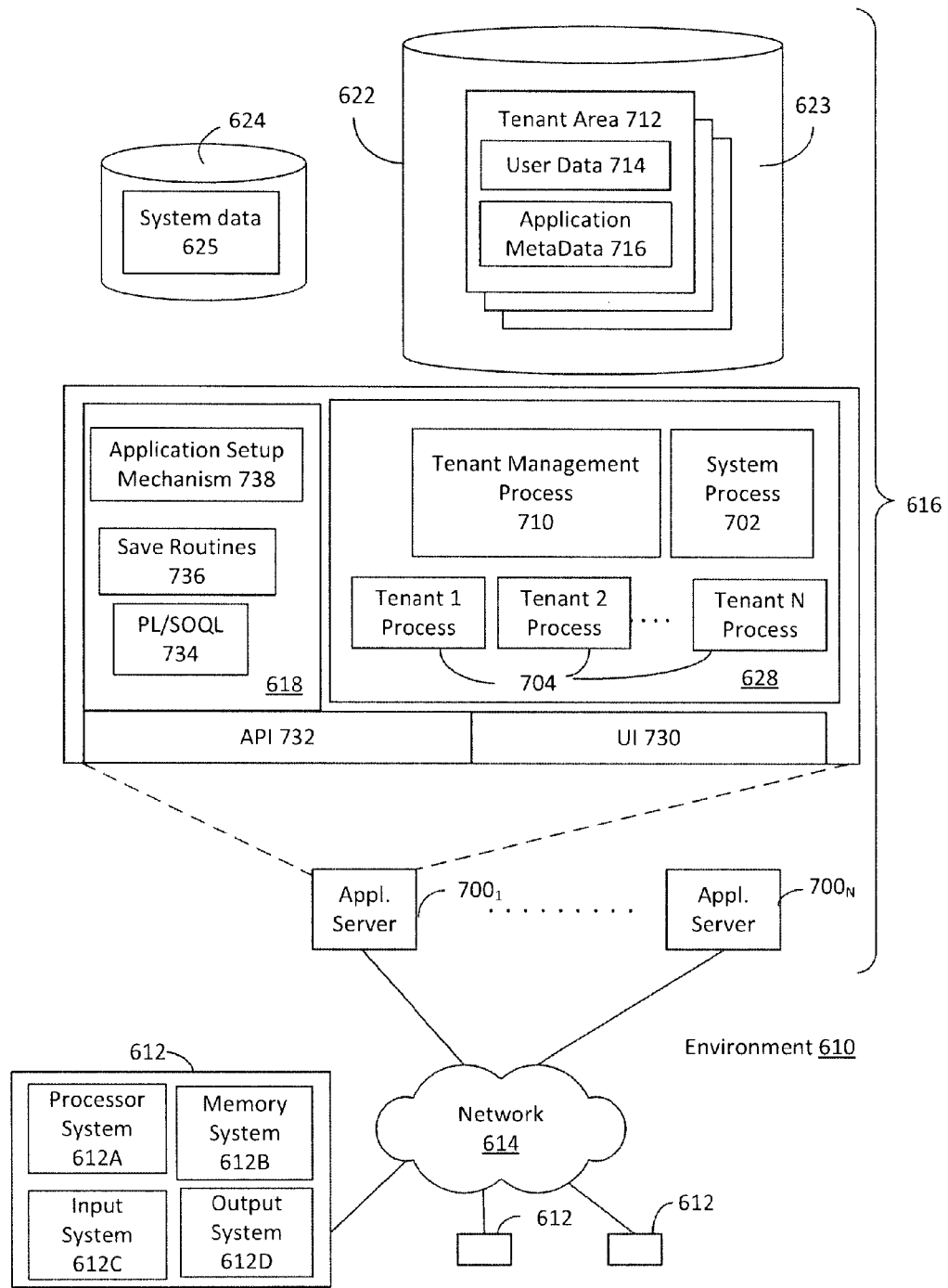
FIG. 7 illustrates a block diagram of an embodiment of elements of FIG. 6 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user data storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers $700_1$-$700_N$, an application platform 618, tenant data storage 622, and system data storage 624. Also shown is system process space 702, including individual tenant process spaces 704 and a tenant management process space 710. Each application server $700_1$-$700_N$ may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user data storage 714 and application metadata 716 might be similarly allocated for each user. For example, a copy of a user's most recently used (MRU) items might be stored to user data storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data 623 and the system data 625 may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by one or more system processes, which manages retrieving application metadata 716 for the subscriber making the invocation and executing the metadata as an application in a virtual machine.

Each application server $700_1$-$700_N$ may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers $700_1$-$700_N$ and the database system. However, it will be apparent to one skilled in the art that other transport protocols may be used to optimize the system depending on the network interconnect used.

In certain embodiments, each application server $700_1$-$700_N$ is configured to handle requests for any user associated with any organization that is a tenant. Because it is desirable to be able to add and remove application servers from the server pool at any time for any reason, there is preferably no server affinity for a user and/or organization to a specific application server $700_1$-$700_N$. In one embodiment, therefore, an interface system implementing a load balancing function (e.g., an F5 Big-IP load balancer) is communicably coupled between the application servers $700_1$-$700_N$ and the user systems 612 to distribute requests to the application servers $700_1$-$700_N$. In one embodiment, the load balancer uses a least connections algorithm to route user requests to the application servers $700_1$-$700_N$. Other examples of load balancing algorithms, such as round robin and observed response time, also can be used. For example, in certain embodiments, three consecutive requests from the same user could hit three different application servers $700_1$-$700_N$, and three requests from different users could hit the same application server $700_1$-$700_N$. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers $700_1$-$700_N$ to request and update system-level and tenant-level data from system 616 that may require sending one or more queries to tenant data storage 622 and/or system data storage 624. System 616 (e.g., an application server $700_1$ in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations and techniques have been described with reference to an embodiment in which techniques for providing machine status information in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for identifying an influencer of a brand, the method comprising:

scanning, by a server, a plurality of social media objects published by at least one social networking entity to identify a first social media object posted by a first user and relating to a brand associated with at least one of a product, an enterprise, a service, a person, a concept, and a trackable object, wherein the plurality of social media objects includes at least one of messages, video and audio clips, and image files posted by a plurality of users;

calculating, by the server, a brand influence score for the first user, wherein the brand influence score is based on a plurality of influence factors, wherein a weighting factor of a first influence factor of the plurality of influence factors is based on at least one of a company with which the first user is affiliated, a title of the first user with respect to the company, and whether the company is one of an existing or prospective customer of the brand;

comparing, by the server, the brand influence score for the first user to a threshold influence score; and identifying, by the server, the first user as a brand influencer when the first user's brand influence score is greater than the threshold influence score.

2. The method of claim 1 wherein the brand influencer influences how other users at least one of relate to and think about the brand.

3. The method of claim 1 wherein the plurality of influence factors is related to at least one of a number of following users following the first user, a status/attribute of a following user, a status/attribute of a second user followed by the first user, a number of times the first social media object is reposted by at least the number of following users, a number of other social media objects relating to the brand and posted by the first user, and reactions and comments relating to the first social media object.

4. The method of claim 1 wherein calculating the brand influence score for the first user comprises:

determining, by the server, for each of the plurality of influence factors a raw score based on at least one of real-time social networking data, and data relating to the first user stored in a customer relationship management (CRM) system; and accumulating, by the server, the raw score of each influence factor to generate a sum of the raw scores, wherein the brand influence score for the first user is the sum of the raw scores.

5. The method of claim 4 wherein calculating the brand influence score for the first user further includes normalizing the raw score of at least one of the plurality of influence factors.

6. The method of claim 4 wherein the CRM system includes a multi-tenant on-demand database system.

7. The method of claim 1 further comprising weighting each of the plurality of influence factors by the weighting factor to reflect each influence factor's importance relative to other influence factors.

8. The method of claim 7 wherein the first influence factor of the plurality of influence factors is directed to attributes of the first user, and wherein the weighting factor of the first influence factor is based on at least one of an identity of the first user, and an occupation of the first user.

9. The method of claim 7 wherein the first influence factor of the plurality of influence factors is directed to attributes of a following user following the first user, and wherein the weighting factor of the first influence factor is based on at least one of an identity of the following user, a relationship between the following user and the first user, an occupation of the following user, a company with which the following user is affiliated, a title of the following user with respect to the company, and whether the company is one of an existing or prospective customer of the brand.

10. The method of claim 7 wherein the first influence factor of the plurality of influence factors is directed to attributes of a leading user followed by the first user, and wherein the weighting factor of the first influence factor is based on at least one of an identity of the leading user, a relationship between the leading user and the first user, an occupation of the leading user, a company with which the leading user is affiliated, a title of the leading user with respect to the company, and whether the company is one of an existing or prospective customer of the brand.

11. The method of claim 7 wherein calculating the brand influence score for the first user comprises:
   determining for each of the influence factors a raw score based on at least one of real-time social networking data provided by the at least one social networking entity, and data relating to the first user stored in a customer relationship management (CRM) system;
   multiplying the raw score by the weighting factor of the influence factor to generate a weighted raw score; and
   accumulating the weighted raw score of each influence factor to generate a sum of the weighted raw scores, wherein the brand influence score for the first user is the sum of the weighted raw scores.

12. The method of claim 1 further comprising recalculating the first user's brand influence score when at least one of a predetermined time period between the posting of the first social media object and the posting of a second social media object relating to the brand posted by the first user has elapsed, an attribute of the first user is updated, and an influence factor is updated.

13. The method of claim 1 further comprising:
   generating automatically an alert notification message identifying the first user as a brand influencer; and
   transmitting the alert notification message to at least one interested user.

14. The method of claim 13 further comprising including in the alert notification message a recommendation to follow the first user.

15. The method of claim 1 further comprising creating, by the server, at least one record associated with at least one of the brand and the first user, and storing the first user's brand influence score in the at least one record.

16. The method of claim 15 wherein the record is stored in a customer relationship management (CRM) system that includes a multi-tenant on-demand database system, and wherein the brand is related to a tenant of the multi-tenant on-demand database system.

17. The method of claim 15 further comprising:
   receiving, by the server, a subscription request from an interested user requesting notifications relating to the brand;
   subscribing, by the server, the interested user to the record associated with the brand;
   generating automatically, by the server, an alert notification message identifying the first user as a brand influencer; and
   transmitting, by the server, the alert notification message to the interested user pursuant to the subscription.

18. The method of claim 15 further comprising:
   receiving, by the server, a command message identifying at least one interested user and including a command to subscribe the at least one identified interested user to notifications relating to the brand;
   subscribing, by the server, the at least one interested user to the record associated with the brand;
   generating automatically, by the server, an alert notification message identifying the first user as a brand influencer; and
   transmitting, by the server, the alert notification message to the at least one interested user pursuant to a the subscription.

19. A tangible non-transitory machine-readable medium carrying one or more sequences of instructions for identifying an influencer of a brand, which instructions, when executed by one or more processors, cause the one or more processors to carry out the steps of:
   scanning a plurality of social media objects published by at least one social networking entity to identify a first social media object posted by a first user and relating to a brand associated with at least one of a product, an enterprise, a service, a person, a concept and a trackable object, wherein the plurality of social media objects includes at least one if messages, video and audio clips, and image files posted by a plurality of users;
   calculating a brand influence score for the first user, wherein the brand influence score is based on a plurality of influence factors, wherein a weighting factor of a first influence factor of the plurality of influence factors is based on at least one of a company with which the first user is affiliated, a title of the first user with respect to the company, and whether the company is one of an existing or prospective customer of the brand;
   comparing the brand influence score for the first user to a threshold influence score; and
   identifying the first user as a brand influencer when the first user's brand influence score is greater than the threshold influence score.

20. An apparatus for identifying an influencer of a brand, the apparatus comprising:
   a processor; and
   one or more stored sequences of instructions which, when executed by the processor, cause the processor to carry out the steps of:
   scanning a plurality of social media objects published by at least one social networking entity to identify a first social media object posted by a first user and relating to a brand associated with at least one of a product, an enterprise, a service, a person, a concept and a trackable object, wherein the plurality of social media objects includes at least one if messages, video and audio clips, and image files posted by a plurality of users;
   calculating a brand influence score for the first user, wherein the brand influence score is based on a plurality of influence factors, wherein a weighting factor of a first influence factor of the plurality of influence factors is based on at least one of a company with which the first user is affiliated, a title of the first user with respect to the company, and whether the company is one of an existing or prospective customer of the brand;
   comparing the brand influence score for the first user to a threshold influence score; and
   identifying the first user as a brand influencer when the first user's brand influence score is greater than the threshold influence score.

* * * * *